Jan. 9, 1968    S. P. RIETEMA ET AL    3,362,600
RADIATION SENSITIVE TAPE SPEED SENSOR
Filed Jan. 6, 1964
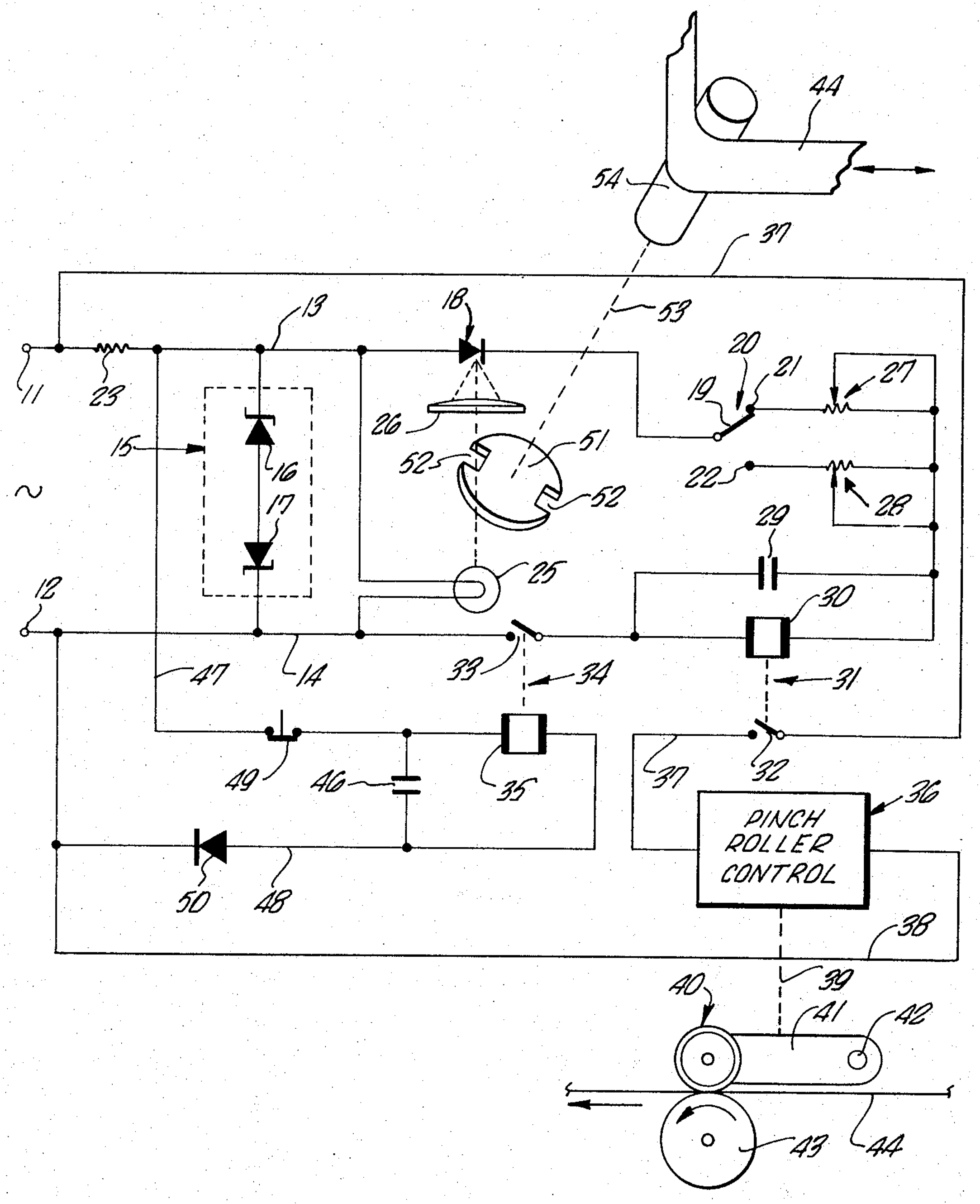
INVENTORS.
SIMON PETRUS RIETEMA
STANLEY RAYMOND TONG
BY
Christie, Parker & Hale
ATTORNEYS.

United States Patent Office 3,362,600

Patented Jan. 9, 1968

3,362,600

RADIATION SENSITIVE TAPE SPEED SENSOR

Simon Petrus Rietema, Glendora, and Stanley Raymond Tong, Duarte, Calif., assignors to Consolidated Electrodynamics Corporation, Pasadena, Calif., a corporation of California Filed Jan. 6, 1964, Ser. No. 335,960
8 Claims. (Cl. 226—35)

This invention relates to a tape speed sensor and, more particularly, to a tape speed sensor and pinch roller control for a tape transport device.

In magnetic tape data processing devices, a magnetic recording tape is handled in a tape transport device which includes a pair of tape reels upon which the tape is coiled, and read and/or write heads adjacent the tape path between the reels. During a data processing operation, the direction of movement of the tape through the transport is reversed many times by reversing the rotation of motors connected to the tape storage reels. The speed of the tape past the heads, however, must be standardized. Accordingly, it is conventional to provide adjacent the tape heads, tape drive capstan means which rotate at a constant speed. The rotation of a single capstan is reversible, or, preferably, two capstans rotating in opposite directions at a constant predetermined rate may be provided. Once the tape is moving in the desired direction, the tape is brought into contact with the periphery of the capstan so that tape movement past the heads is controlled by the capstan.

Conventional tape transport devices usually include a pair of pinch rollers. Where two oppositely rotating capstans are provided, each capstan has a pinch roller disposed adjacent thereto. Each pinch roller is movable toward and away from the adjacent capstan to engage tape passing between the capstan and the pinch roller with the capstan. Only one capstan and pinch roller combination is operable at a given time. Where only one capstan is provided, the pinch rollers are disposed on opposite sides of the capstan.

In order to assure that the tape is handled in a manner which does not unduly load the tape and cause breakage thereof, it is desired that a given pinch roller be moved toward its cooperating capstan only when the linear velocity of the tape passing the capstan approximates the linear velocity of the periphery of the capstan. If a slow moving tape is engaged with a rapidly rotating capstan, the sudden acceleration imposed on the tape may break the tape. Alternatively, if the tape is moving faster than the capstan, the engagement of the tape with the capstan acts as a brake and an undesirable pile-up of loose tape may occur adjacent the capstan, or the tape "downstream" of the capstan may break in response to the sudden change in load upon the tape. It is therefore desirable that the tape transport include means for sensing the speed of the tape and that such sensing means control the operation of the mechanisms for moving the pinch rollers toward the capstan so that the tape is engaged with the capstan only when the tape speed is substantially equal to the speed of the tape engaging surface of the capstan.

Generally speaking, in terms of method this invention provides a method for sensing the speed of a tape in a tape transport device. The method includes the step of generating a series of electrical pulses at a frequency proportional to the velocity of the tape. The method also includes the step of integrating the pulses to provide a voltage proportional to the frequency of the pulses. The magnitude of the voltage is useful as a measure of the velocity of the film. Preferably, this voltage is applied as a signal to a pinch roller operating mechanism to assure that the pinch roller moves the tape into engagement with an adjacent capstan when the tape and capstan tape drive surface are moving at substantially the same velocity.

In terms of apparatus, the present invention provides a tape speed sensor for a tape transport device. The sensor includes a photo-electric rectifier and means for applying an AC voltage to the rectifier. Means are provided for directing a beam of light upon the rectifier. The sensor also includes means for interrupting the beam at a frequency proportionate to the velocity of tape in the transport device so that the rectifier passes pulses at said frequency. The sensor further includes means coupled to the rectifier and having a DC voltage as an output, the output voltage being proportionate to the frequency of the pulses from the rectifier.

The above-mentioned and other features of the invention are more fully set forth in the following description of the invention taken in conjunction with the accompanying drawing, which is a schematic representation of a portion of the mechanical, optical, and electrical apparatus of a tape speed sensor and pinch roller control according to the present invention.

Referring to the drawing, a tape speed sensor and pinch roller control circuit is illustrated. A pair of input terminals 11 and 12 are provided and are adapted to be connected to a source of alternating current (AC) voltage. Conductors 13 and 14 are connected to input terminals 11 and 12, respectively. A voltage regulator 15, including a pair of Zener diodes 16 and 17 connected in series opposition to one another, is connected between conductors 13 and 14 to isolate the pulse generating and integrating means (described below) from variations in the AC line voltage applied to the input terminals. A photo-diode or photo-electric rectifier 18, which acts like an ordinary diode and provides half-wave rectification of the regulated AC voltage applied thereto when light falls on the junction of the photo-diode, is connected to conductor 14 opposite input terminal 11 from the voltage regulator. The photo-diode is connected in series with a movable contact 19 of a selector switch 20 which also includes a pair of output terminals 21 and 22. A limiting resistor 23 is connected in series between the voltage regulator and input terminal 11 to protect the photo-diode from overloading.

A lamp 25 is disposed adjacent the photo-diode and is connected across the voltage regulator so that the lamp is powered by the regulated output of the voltage regulator. A focusing lens 26 is disposed between lamp 25 and photo-diode 18 to direct a beam of light from the lamp upon the junction of the photo-diode.

Selector switch terminals 21 and 22 are connected to variable resistors 27 and 28, respectively. The variable resistors are connected in parallel with one another in series with a capacitor 29 and solenoid 30 of a DC pinch roller control relay 31 having normally open contacts 32. Capacitor 29 and relay solenoid 30 are connected in parallel with one another between the variable resistors and conductor 14 through normally open contacts 33 of a DC time delay relay 34 having a solenoid coil 35.

Normally open contacts 32 of pinch roller control relay 31 are in series between AC input terminal 11 and a pinch roller control and actuator device 36 via a conductor 37. Specifically, the pinch roller control device may be a solenoid coupled mechanically to pinch roller circuit lever 41 via a motion amplifying bellcrank linkage. A conductor 38 extends from the output of the pinch roller control and actuator to AC input terminal 12. The pinch roller control and actuator is mechanically connected, as indicated by dashed line 39, to a rotatable pinch roller 40. The pinch roller, as shown in the drawing for example, is rotatably mounted to a lever 41 which is pivotally mounted to a fixed pivot axle 42 spaced from the pinch roller. The pinch roller is disposed adjacent a rotatable tape drive capstan 43 and a magnetic recording tape 44 is passed between the pinch roller and the capstan.

Solenoid coil 35 of time delay relay 34 is connected in parallel with a time delay capacitor 46 across the AC input terminals by a time delay circuit input conductor 47 and a time delay circuit output conductor 48. Conductor 47 includes a normally closed stop switch 49. Conductor 48 includes a rectifier 50 which provides half-wave rectification of the AC voltage applied to terminals 11 and 12.

Light beam interruptor means are provided between lamp 25 and photo-diode 18. As illustrated in the drawing, the light interruptor means preferably is provided in the form of a rotatable opaque disc 51 defining a plurality of slots 52 therethrough adjacent to and at regular intervals around the periphery of the disc. The slots define translucent portions of the disc. Disc 51 preferably is mechanically connected, as indicated by dashed line 53 in the drawing, preferably directly to a rotatable roller 54 with which tape 44 is engaged. As the tape moves relative to roller 54, the roller is rotated at a rate directly related to the linear velocity of the tape through the tape transport device. Accordingly, disc 51 is rotated at a rate proportionate to the linear velocity of the tape. As disc 51 is rotated, the light beam falling upon photo-diode 18 is interrupted at a frequency proportionate to the linear velocity of tape 44. As pulses of light are passed through slots 52 of the disc and fall upon the junction of the photo-diode, the photo-diode is caused to pass pulses of current to selector switch contact 19. The frequency of the pulses passed by photo-diode 18 is equal to the frequency at which the light beam is interrupted.

As used herein when referring to the operation of the photo-diode, a pulse passed by the photo-diode includes one or more positive portions of the AC signal applied to the photo-diode and/or a fractional part of the positive portion of the applied AC signal, depending upon the phasing of the beam chopping action of disc 51 relative to the applied signal, as well as upon the length of time the photo-diode is rendered conductive. Because of the averaging operation of the integrator, it is not important whether a given pulse comprises one or more positive portions of the applied AC signal. The time between successive conductive states of the photo-diode, not the character of a given pulse per se, is what determines the voltage developed across capacitor 29.

The one of the variable resistors which is connected to selector switch contact 19 and capacitor 29 comprise a low pass filter or integrator circuit having a DC voltage as an output. The DC voltage developed across capacitor 29 is proportionate to the frequency and amplitude of the pulses passed by the photo-diode. When the voltage developed across capacitor 29 reaches a predetermined value, pinch roller control relay 31 is operated so that contacts 32 are closed and pinch roller control and actuator 36 is energized to move pinch roller 40 toward capstan 43 to engage tape 44 with the capstan.

It was noted above that it is desirable that the pinch roller not be moved toward the capstan until the tape moving past the capstan has a linear velocity substantially equal to the velocity of the periphery of the capstan. Variable resistances 27 and 28 may be set to assure that the DC voltage developed across capacitor 29 does not reach a value sufficient to operate relay 31 until the linear velocity of tape 44 is substantially equal to the velocity of the capstan tape drive surface. Preferably, variable resistors 27, 28 are adjusted to tape speed of 30 and 60 inches per second, respectively.

Normally AC power is applied to input terminals 11 and 12 only when the means (not shown) for moving the tape through the transport device is energized. Accordingly, when lamp 25 is first illuminated, disc 51 is substantially stationary but begins to move substantially immediately upon energization of the circuit. There may be situations, however, in which one of slots 52 is aligned transversely of the light beam when lamp 25 is first energized and light may pass through the slot to the junction of the photo-diode for a time long enough to cause a voltage sufficient to actuate relay 31 to be developed across capacitor 29. The result of such an occurrenue is that pinch roller 40 is moved toward capstan 43 before tape 44 is moving at a velocity approximately equal to the velocity of the periphery of the capstan. To prevent such an occurrence, time delay relay 34 is provided so that a circuit is not made through the integrator circuit until a predetermined period of time has elapsed following energization of the circuit. The duration of this control interval is determined by capacitor 46 which is of a value sufficient to assure that time delay contacts 33 do not close until disc 51 is rotating at a rate sufficient to assure that no single pulse passed by photo-diode 18 is of a duration sufficient to cause relay 31 to operate.

Lamp 25 is across voltage regulator 15 so that the intensity of the light developed by lamp 25 is constant. Moreover, the AC voltage applied to photo-diode 18 is constant. Accordingly, the pulses passed by the photo-diode are of constant amplitude with the result that the only variable in the signals applied to the integrator is the frequency of the pulses and the output of the integrator is proportionate to the speed of tape 44 past roller 54.

While the invention has been discribed above in conjunction with specific apparatus and configurations thereof, this has been by way of example only and is not to be considered as limiting the scope of this invention.

What is claimed is:

1. Tape speed sensing apparatus in a tape transport device comprising
   - (a) a photo-electric rectifier,
   - (b) means for supplying an AC voltage to the rectifier,
   - (c) a light source powered by said AC voltage,
   - (d) means for directing a beam of light from the light source to the rectifier,
   - (e) means for interrupting the beam at a frequency proportionate to the velocity of tape in the transport device so that the rectifier passes pulses at said frequency,
   - (f) means for regulating said AC voltage so that the intensity of the light beam is constant and the amplitude of the pulses passed by the rectifier is constant, and
   - (g) means coupled to the rectifier and having a DC voltage as an output, the output voltage being proportionate solely to the frequency of the pulses from the rectifier.

2. Tape speed sensing apparatus in a tape transport device comprising
   - (a) a photo-electric rectifier,
   - (b) means for supplying an AC voltage to the rectifier,
   - (c) a light source powered by said AC voltage,
   - (d) means for directing a beam of light from the light source to the rectifier,
   - (e) means for interrupting the beam at a frequency proportionate to the velocity of tape in the transport device so that the rectifier passes pulses at said frequency including
     - (1) a rotatable roller engageable by the tape so that the rotational velocity of the roller is proportionate to the velocity of the tape past the roller, and
     - (2) a slotted opaque disc connected to the roller for rotation thereby and disposed transversely of the beam,
   - (f) means for regulating said AC voltage so that the intensity of the light beam is constant and the amplitude of the pulses passed by the rectifier is constant, and
   - (g) means coupled to the rectifier and having a DC voltage as an output, the output voltage being proportionate to the frequency of the pulses from the rectifier.

3. In a tape transport including a rotatable tape drive capstan and a pinch roller movable toward the capstan for engaging a tape with the capstan, a pinch roller actuator comprising (a) a photo-electric rectifier,
(b) means for supplying an AC voltage to the rectifier,
(c) means for directing a beam of light upon the rectifier,
(d) means for interrupting the beam at a frequency proportionate to the velocity of tape in the tape transport so that the rectifier passes pulses at said frequency,
(e) integrator means coupled to the rectifier so as to receive pulses from the rectifier and having, as an output, a DC voltage proportionate to the frequency of the pulses from the rectifier, and
(f) means coupled to the integrator means to receive the output thereof operable when the DC voltage reaches a predetermined value to move the pinch roller toward the capstan whereby tape disposed between the pinch roller and the capstan is not engaged with the capstan until the tape is moving at a predetermined velocity.

4. In a tape transport including a rotatable tape drive capstan and a pinch roller movable toward the capstan for engaging a tape with the capstan, a pinch roller actuator comprising (a) a photo-electric rectifier,
(b) means for supplying an AC voltage to the rectifier,
(c) means for directing a beam of light upon the rectifier,
(d) means for interrupting the beam at a frequency proportionate to the velocity of tape in the transport device so that the rectifier passes pulses at said frequency,
(e) an integrator circuit coupled to the rectifier so as to receive pulses from the rectifier and having, as an output, a DC voltage proportionate to the frequency of the pulses from the rectifier,
(f) switching means coupled to the integrator circuit and operable by the output thereof when the DC voltage reaches a predetermined value, and
(g) means coupled to the switching means operative in response to operation of the switching means to move the pinch roller toward the capstan.

5. In a tape transport including a rotatable tape drive capstan and a pinch roller movable toward the capstan for engaging a tape with the capstan, a pinch roller actuator comprising (a) a photo-electric rectifier,
(b) a source of AC voltage,
(c) means coupled to the AC voltage source for regulating the AC voltage and for supplying the regulated AC voltage to the rectifier,
(d) a light source coupled to the regulating and supplying means for operation by the regulated AC voltage,
(e) means for directing a beam of light from the light source to the rectifier,
(f) a slotted opaque disc disposed transversely of the beam,
(g) means for rotating the disc at a rate porportionate to the velocity of the tape in the transport device so that the beam is interrupted and the rectifier passes pulses at a frequency proportionate to the velocity of the tape,
(h) an integrator circuit coupled to the rectifier and having as an output a DC voltage proportionate to the frequency of the pulses passed by the rectifier,
(i) switching means coupled to the integrator circuit and operable when the DC voltage reaches a predetermined value,
(j) means coupled to the switching means operative in response to operation of the switching means to move the pinch roller toward the capstan, and
(k) time delay means coupled between the source of AC voltage and the integrator circuit for rendering the integrator circuit inoperative for a predetermined period following initiation into operation of the light source.

6. The method of sensing the speed of a tape in a tape transport apparatus comprising the steps of (a) directing a beam of light upon a photoelectric rectifier,
(b) supplying an AC voltage to the rectifier,
(c) disposing an opaque disc transversely of the beam of light adjacent the rectifier, the disc having therein translucent portions at regular intervals about the disc,
(d) rotating the disc at a rate proportionate to the speed of the tape through a selected portion of the tape transport apparatus so that the light beam is interrupted at a frequency proportionate to the tape speed and the rectifier passes pulses at said frequency, and
(e) integrating the pulses to provide a DC voltage proportionate solely to said frequency as a measure of the tape speed.

7. In a tape transport apparatus including a rotatable capstan for moving the tape at a predetermined speed through a selected portion of the transport apparatus, and a pinch roller movable toward the capstan for engaging the tape with the capstan, the method of moving the pinch roller toward the capstan when the tape moves at a predetermined speed through the transport apparatus past the capstan comprising the steps of (a) directing a beam of light upon a photo-electric rectifier,
(b) supplying an AC voltage to the rectifier,
(c) disposing light interruptor means in the beam adjacent the rectifier,
(d) operating the interruptor means at a rate proportionate to the speed of the tape past the capstan so that the beam is interrupted at a frequency proportionate to the tape speed and the rectifier passes pulses at said frequency,
(e) integrating the pulses to provide a DC voltage proportionate to said frequency, and
(f) operating means for moving the pinch roller toward the capstan when the DC voltage has a value correlated to the predetermined speed of the tape past the capstan.

8. In a tape transport including a rotatable tape drive capstan driven at a predetermined speed and a pinch roller movable toward the capstan for engaging a tape with the capstan, a pinch roller actuator comprising (a) means for generating a series of electrical pulses at a frequency proportionate to the speed of the tape,
(b) means for integrating the pulses to provide a voltage proportionate solely to the frequency of the pulses, and
(c) means coupled to the integrating means for moving the pinch roller toward the capstan to engage the tape and the capstan when the voltage has a predetermined value indicative of a selected relation between tape speed and capstan speed.

References Cited

UNITED STATES PATENTS

| | | | |
|---|---|---|---|
| 2,583,580 | 1/1952 | Ludwig | 250—219 |
| 2,924,754 | 2/1960 | Mead | 250—211 X |
| 2,964,637 | 12/1960 | Keizer | 250—211 |
| 3,146,432 | 8/1964 | Johnson | 340—263 |
| 3,193,744 | 7/1965 | Seward | 250—233 X |

WALTER STOLWEIN, *Primary Examiner.*